United States Patent [19]

Walker et al.

[11] Patent Number: 5,054,064

[45] Date of Patent: Oct. 1, 1991

[54] VIDEO CONTROL SYSTEM FOR RECORDED PROGRAMS

[75] Inventors: Stephen S. Walker, Marlborough; Clarence M. Sidlo; Melvin J. Teare, both of Framingham, all of Mass.

[73] Assignee: GTE Laboratories Incorporated, Waltham, Mass.

[21] Appl. No.: 501,688

[22] Filed: Mar. 29, 1990

[51] Int. Cl.$^5$ .............................................. H04N 7/167
[52] U.S. Cl. ............................................ 380/5; 380/20
[58] Field of Search ...................................... 380/5, 20

[56] References Cited

U.S. PATENT DOCUMENTS

| | | | |
|---|---|---|---|
| 4,567,512 | 1/1986 | Abraham | 380/5 |
| 4,595,950 | 6/1986 | Löfberg | 380/5 |
| 4,635,112 | 1/1987 | Tomioka et al. | 380/5 |

Primary Examiner—Thomas H. Tarcza
Assistant Examiner—David Cain
Attorney, Agent, or Firm—J. Stephen Yeo

[57] ABSTRACT

A video system includes a central facility and a terminal. Means are provided for playing a video recording medium storing a video program including a series of television fields including a first field containing both a random digital code encrypted according to a code encryption key and program identification data, and a second field containing an unintelligible video signal previously transformed from a intelligible video signal according to the random digital code. The terminal includes means for sending the program identification data to the central facility. The central facility includes a data base for storing and retrieving at least one code encryption key corresponding to the program identification data and means for sending the code encryption key from the central facility to the terminal. The terminal further includes means for receiving the code encryption key from the central facility, decrypting means for decrypting the encrypted digital code of the first frame in accordance with the code encryption key, and means for transforming the unintelligible video signal of the second frame to the intelligible video signal using the decrypted random digital code.

7 Claims, 2 Drawing Sheets

VIDEO CONTROL SYSTEM FOR RECORDED PROGRAMS

RELATED COPENDING APPLICATIONS

U.S. patent application Ser. No. 07/501,620, now abandoned, filed the same date as this, for Video Control System Having Billing Capability is concerned with video control systems having fication data and program identification data.

U.S. patent application Ser. No. 07/501,685, now abandoned, filed the same date as this, for Video Control System Having Terminal Specific Encryption Key is concerned with video control systems having a terminal specific encryption k U.S. patent application Ser. No. 07/501,684, now U.S. Pat. No. 4,991,200, issued Feb. 5, 1991 filed the same date as this, for Video Control System Having Session Encryption Key is concerned with video control systems having a session encryption key.

U.S. patent application Ser. No. 07/501,683, now U.S. Pat. No. 5,046,090, issued Sept. 3, 1991, filed the same date as this, for Recorded Medium For Video Control System is concerned with video media for use with such systems.

U.S. patent application Ser. No. 07/501,682, now U.S. Pat. No. 5,046,092, issued Sept. 3, 1991, filed the same date as this, for Video Control System For Transmitted Programs is concerned with video control systems wherein the video program is transmitted to a terminal.

BACKGROUND OF THE INVENTION

This invention is concerned with video control systems and more particularly is concerned with such systems using video recording storing a video program.

It is desirable to provide a video control system which decrypts encrypted broadcasts or recorded copies of video material such that the subsequent viewing is controlled. This allows the owner to either forbid viewing, or collect revenue at his or her discretion.

In the prior art, a software distribution system is known wherein a computer program is downloaded once, followed by an access key to allow use of it on each subsequent use. This system uses a dynamic key that constantly changes, and is directly related to an user's decoder box, both by ID and an internal dynamic counter.

Also known is a video system that autonomously controls the viewing of a recording for either 24 hours or once only. It does not have the power of control desired.

SUMMARY OF THE INVENTION

Briefly, a video system includes a central facility and a terminal. Means are provided for playing a video recording medium storing a video program including a series of television fields including a first field containing both a random digital code encrypted according to a code encryption key and program identification data, and a second field containing an unintelligible video signal previously transformed from an intelligible video signal according to the random digital code. The terminal includes means for sending the program identification data to the central facility. The central facility includes a data base for storing and retrieving at least one code encryption key corresponding to the program identification data and means for sending the code encryption key from the central facility to the terminal.

The terminal further includes means for receiving the code encryption key from the central facility, decrypting means for decrypting the encrypted digital code of the first frame in accordance with the code encryption key, and means for transforming the unintelligible video signal of the second frame to the intelligible video signal using the decrypted random digital code.

DETAILED DESCRIPTION OF THE INVENTION

Figure 1:
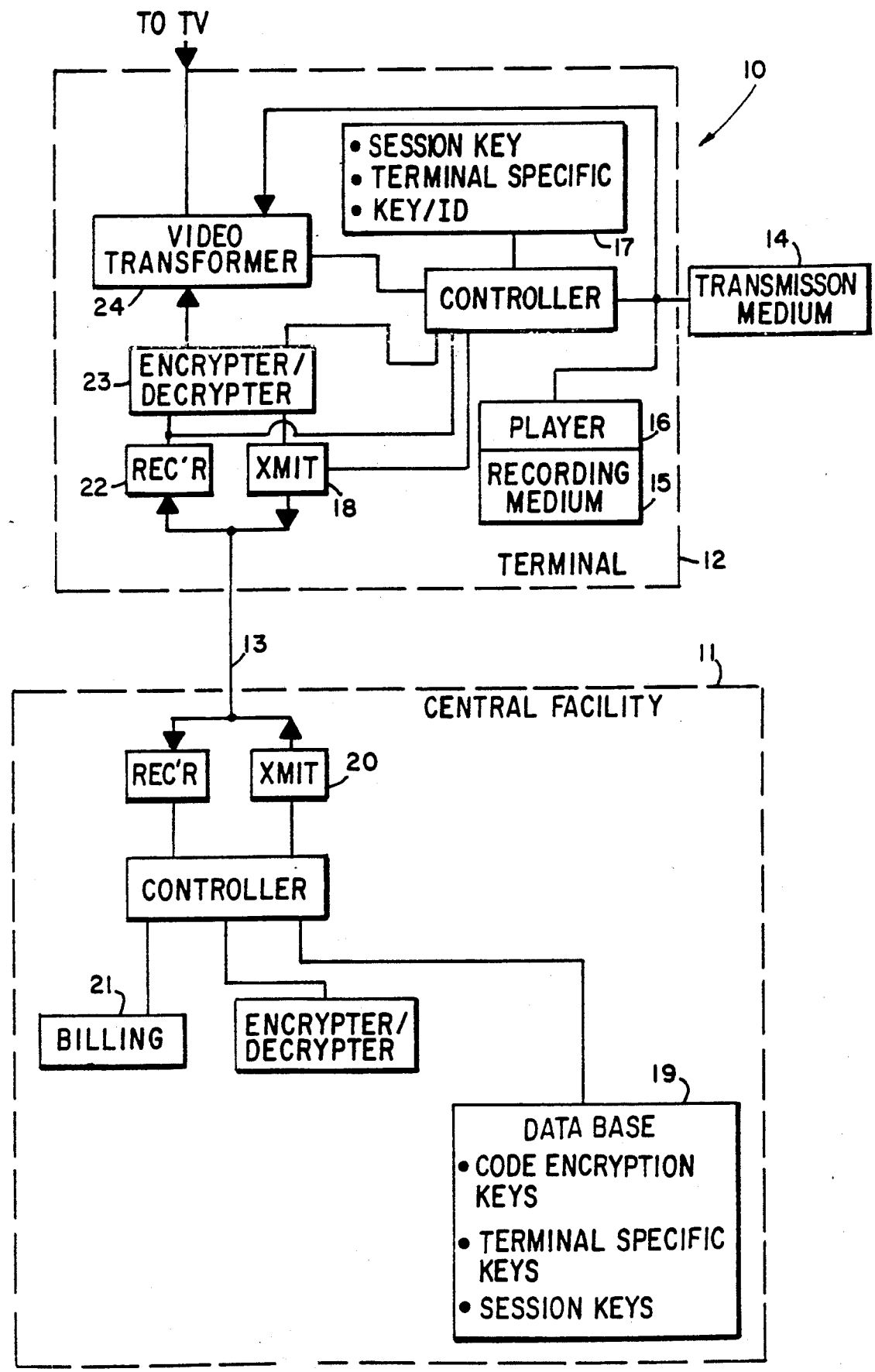
FIG. 1 is a block diagram of a video system embodying the invention.
Figure 2:
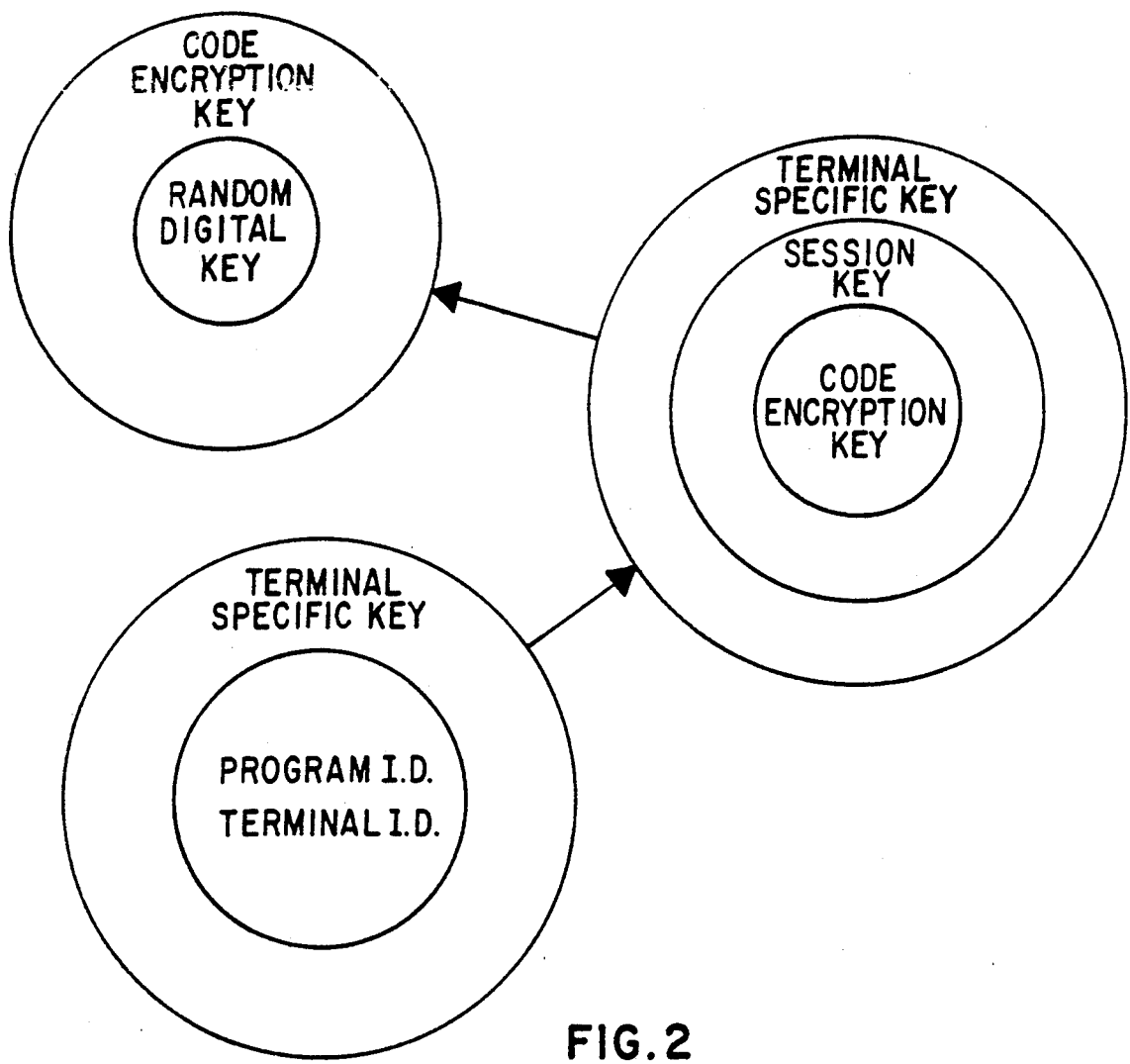
FIG. 2 shows an encryption arrangement according to the invention.

Reference is made to FIG. 1 which is a block diagram of a video system 10 embodying the invention. The video system comprises a central facility 11, a terminal 12, and a duplex communication link 13 between central facility 11 and terminal 12. An overview of the system is first given.

Terminal 12 is provided with a video program including a series of television fields including first field containing both a random digital code encrypted according to a code encryption key and program identification data, and a second field containing an unintelligible video signal previously transformed from an intelligible video signal according to the random digital code.

The video program may be transmitted by broadcast, cable, satellite, fiber, or any other transmission medium 14. Alternative the video program may be stored on a video recording medium 15 such as magnetic tape or video disk and played by player 16. The unintelligible video signal may be either analog or digital.

A second field containing both a random digital code encrypted according to a code encryption key and program identification data, and is followed according to a third field containing an unintelligible video signal previously transformed from an intelligible video signal according to the random digital code of the second field.

Terminal 12 includes means 17 to store terminal identification data and means to send to the central facility 11 the terminal identification data and the program identification data over link 13.

Central facility 11 includes a data base 19 for storing and retrieving at least one code encryption key corresponding to the program identification data, means 20 for sending the code encryption key from the central facility 11 to the terminal 12, and means 21 for generating billing data based on both terminal identification data and program identification data.

Terminal 12 further including means 22 for receiving the code encryption key from central facility 11, decrypting means 23 for decrypting the encrypted random digital code of the first frame in accordance with the code encryption key, and means 24 for transforming the unintelligible video signal of the second frame to the intelligible video signal using the decrypted random digital code.

Each terminal 12 may have a terminal specific encryption key and means 18 to send to the central facility the program identification data and the terminal 11 identification data encrypted according to the terminal specific encryption key. The central facility 11 has means for storing a duplicate of the terminal specific encryption key, means for encrypting the code encryption key according to the terminal specific encryption key; and means for sending the encrypted code encryption key from central facility 11 to terminal 12.

Terminal 12 further includes means 22 for receiving the encrypted code encryption key from central facility 11, decryption means 23 for decrypting the code encryption key according to the terminal specific encryption key, and decrypting the encrypted random digital code of the first frame in accordance with the code encryption key, and means 24 for transforming the unintelligible video signal of the second frame to the intelligible video signal using the decrypted random digital code.

Terminal 12 includes means to encrypt the terminal identification data according to the terminal specific encryption key, means to send unencrypted terminal identification data and encrypted terminal identification data to the central facility, which in turn includes means to compare unencrypted and encrypted terminal identification data to verify terminal identity.

A plurality of code encryption keys may be used for one program wherein a desired code encryption key is selected from the plurality of code encryption keys in accordance with code encryption key identification data corresponding to the random digital code.

Various features of the system are now discussed in more detail.

System 10 controls the viewing of video programs, by which is meant any video material, either transmitted or recorded, in television format consisting of a series of fields of lines. Two interlaced fields make up a television frame.

Video programs are rendered unintelligible, e.g. scrambled, by any analog or digital method, and are made intelligible, e.g. descrambled, using random digital codes located in fields. The random digital keys are themselves encrypted and decrypted by a one or more key obtained from a database located at the central facility, along with user-specific information at the time of viewing. The system does not stop copying, it controls viewing, while protecting revenues. As such, it can encourage copying, which could ease the distribution issue by controlling the playback such that revenue can be collected each time.

Preferably duplex communication link 13 is a continuous data channel between a terminal and a central facility such as an ISDN D-channel or by modem a regular phone line.

The video program is encrypted, and needs a decrypter in the terminal for viewing. The decrypter uses data embedded in the video program along with a data access to correctly perform the decryption, so the process is completely controlled. The embedded data and key transfer from the remote database may be protected with public domain encryption techniques, providing high level security before first viewing.

The video program may be recorded as is, but it is still unviewable. To view it, the decrypter is used, along with the encrypted embedded data, and an access to a secure database, to perform the decryption. Recordings may be freely copied, but remain unviewable unless used with the decrypter.

To view the programs requires access to the database using encrypted data transfer. This process yields the control of the video program, whether recording or transmission. The decrypter requires one or more keys that arrives from the database. To get the key, information from the video program as well as terminal identification is sent to the database.

A direct Electronic funds Transfer (EFT) debit can be performed using the information. It the program is a video store copy, the EFT could include the store fee and the copyright fee. Note that the video distribution to video stores becomes trivial, as they are encouraged to take a direct recording with a video store key, along with their authorized converter box, and make as many copies as they like. The revenue control takes place at viewing time. This encourages a shareware type of distribution.

A passkey can be sent to the database, to allow viewing of questionable taste films by adults, controlling access by minors.

On the first access, the database will capture a signature derived from the user's equipment and the recording, and store it for subsequent tracking. As there is a compelled database access in this process, data on usage may be collected. This same process may be used for revenue collection.

The system preferably uses at least one downloadable key, a encrypted video program that uses the key for decryption, and data stored a field of the video program. It may be implemented in an all digital, analog or mixed analog/digital environment.

The video programs are encrypted, with data relating to the programs, e.g. where and when, who transmitted it. The data may also contain part of the decryption key. This information would be extracted from the signal, and used to access a database, maintained by the program's owners, to obtain an encrypted key for the decrypter. After a subscriber and/or a credit check is successfully completed, the one or more keys would be transmitted. At this time the owner has obtained usage data, with a specific user's ID, and has the option of billing him. If it is a free program, at least the viewer data is available.

If a user records a transmission or another recording, he captures the encrypted signal, along with embedded data, as described above. This accomplishes the signature part of the process. A recording created by this method may be on a regular VCR, but is encrypted and individually marked. Copying a recording does not affect the system, as the rerecording is only usable with the correct keys. Potentially, the first few minutes of a program might be viewable without the need of a key, to allow the user to see what the contents of the program are, as well as to allow time for the database access and key synchronization process.

To play a recording back, it is necessary to re-obtain the one or more keys. The combination of data stored in a field is used to access the database. Before the keys are made available, there is a check that the terminal identification and the embedded data match.

In the case wherein a recording is rented from a video store, a code may identify the store. The database recognizes the recording as a rental copy, and charge either the user or the video store a fee. If the recording is viewed a second time, the charge is repeated. In the event a copy is made, when it is played, the database will identify the originating video store, but not the actual copier. However, if validation is performed at rental time, there would be some measure of control. If the entire charging process were to be reversed, such that the viewer carries all the liability for charges, then copying is encouraged, as per shareware, and the distribution problem is minimized, while revenues are maintained on a usage basis.

The program's owner has the responsibility to get a secured copy to whoever deals with the distribution of the programs The programs are encrypted, and require a database update to enable viewers to make use of the program. The viewer has a terminal including a decrypter, linked to the central facility's database via an automatic dial-up, that, when enabled, decrypts the video program. As appropriate, there can be credit checks and billing from the database, as well as statistics collection.

The encryption has two levels, one for protection of video decryption codes on the program, and one for protection of messages between the terminal and the central facility. Both may use the NBS Data Encryption Standard (DES).

DES encryption and decryption may be implemented with a commercial Motorola 6859 Data Security Device or similar product at the terminal and at the central facility.

The decryption code itself is protected by being DES-encrypted. The decryption key is not on the video program but is retained in the database at the central facility. A program identification number and a decryption key number allow the central facility to recover the decryption key itself and send it to the terminal for decrypting the decryption codes.

A different DES decryption key is not required for every field. One key can span several fields. DES key requests and acknowledgements from the terminal may also act as keep-alive messages to the central facility.

DES decryption keys are transmitted from the central facility to the terminal protected by a higher-level DES "session" key terminal requests for new keys as the tape progresses are also protected by the DES session key. This key is generated by the central facility at the beginning of the session and remains valid for the duration of the session. The terminal begins the session using a terminal-unique DES key stored in a ROM.

Frame contents are transferred from the Analog Subsystem to the DCSS and the decrypted decryption code from the DCSS to the Analog Subsystem over the analog interface shown in the Figure. Transfer of data between the subsystems may be coordinated by means of the vertical and horizontal blanking signals and their derivative interrupts.

All messages between terminal and central facility use Cyclic Redundancy Code (CRC) checking to verify message integrity. The CRC-CCITT generating polynomial generates two block check characters (BCC) for each message. If the terminal receives a message that is not verified by the BCC, it sends a request (ARQ) to the central facility to retransmit the last message. The central facility does not attempt to ARQ garbled messages. It discards them and waits for a terminal to send again.

Message exchange in the VCS is by a positive acknowledgment scheme in which a response of some kind is expected for every message sent. For example, a terminal expects a DES decryption key message after it sends a request for the same; the central facility expects a key receipt acknowledge after it sends the key message.

When a user begins to play a protected program, the terminal initiates a session by sending a "session start" message (STS) to the central facility containing user and program identifications. The message contains message type, user number and CRC code in the clear, but the balance of the message is DES-encrypted with the initial DES session key stored in the terminal ROM. (The user identification is also stored in ROM.) The central facility uses the unencrypted data to access its database and find the user DES value for decrypting the remainder of the message.

The central facility authenticates the message by comparing clear and decrypted user numbers. If the user numbers are identical, the central facility then confirms that the program serial number is valid. The central facility may also check user credit. If all is well, the central facility accepts the session and generates a new (and random) DES key that is unique for that session. It encrypts this using the initial user value in the database and sends it to the terminal, which decrypts the message and stores the new value in its database (MCU RAM) as the session key for the remainder of the session.

The central facility then uses the tape and decryption key number in the STS message to recover a set of DES decryption keys for the program from the database. These are encrypted with the session key and sent to the terminal at the start of a session or during the course of a session.

The terminal generates session start, key acknowledgement, and ARQ messages. The central facility responds in kind. Both the central facility and the terminal generate and verify block check characters.

The preferred embodiment and best mode of practicing the invention have been described. Alternatives now will be apparent to those skilled in the art in light of these teachings. Accordingly the invention is to be defined by the following claims and not by the particular examples given.

What is claimed is:

1. A video system comprising:
a central facility; and
a terminal including means for playing a video recording medium storing a video program including a series of television fields including a first field containing both a random digital code encrypted according to a code encryption key and program identification data, and a second field containing an unintelligible video signal previously transformed from an intelligible video signal according to said random digital code;
said terminal including means for sending said program identification data to said central facility;
said central facility including a data base for storing and retrieving at least one code encryption key corresponding to the program identification data and means for sending said code encryption key from said central facility to said terminal, said terminal further including means for receiving the code encryption key from said central facility, decrypting means for decrypting the encrypted digital code of said first frame in accordance with said code encryption key and means for transforming said unintelligible video signal of said second frame to said intelligible video signal using the decrypted random digital code.

2. The system of claim 1 wherein said recording medium is magnetic tape.

3. The system of claim 1 wherein said unintelligible video signal is analog.

4. The system of claim 1 wherein said unintelligible video signal is digital.

5. The system of claim 1 wherein said recording medium is a video disc.

6. The system of claim 1 wherein said unintelligible video signal is analog.

7. The system of claim 1 wherein said unintelligible video signal is digital.

* * * * *